United States Patent [19]
Dillman et al.

[11] 3,714,627
[45] Jan. 30, 1973

[54] VEHICLE INFLATABLE CUSHION ACTUATION AND MONITORING CIRCUIT

[75] Inventors: Ned E. Dillman, Kokomo, Ind.; Arden G. Gillund, Oak Creek, Wis.; Victor O. Muth, Pittsford, N.Y.; Pasquale Recupito, New Berlin, Wis.

[73] Assignee: General Motors Corporation, Detroit, Mich.

[22] Filed: Oct. 20, 1971

[21] Appl. No.: 190,978

[52] U.S. Cl. .................................. 340/52 H, 340/262
[51] Int. Cl. ............................................. B60r 21/08
[58] Field of Search ................ 340/52 R, 52 H, 262; 200/61.45; 180/103, 91, 104

[56] References Cited

UNITED STATES PATENTS

| | | | |
|---|---|---|---|
| 3,633,159 | 1/1972 | Dillman et al. | 340/52 H |
| 3,668,627 | 6/1972 | Brainerd | 340/52 H |

*Primary Examiner*—Alvin H. Waring
*Attorney*—Eugene W. Christen et al.

[57] ABSTRACT

The actuation circuit includes a plurality of electrically operated actuators for controlling the inflation of a plurality of inflatable cushions located in a vehicle in response to closure of condition responsive switches. The series circuit formed by the switches and actuators is connected with a battery and a storage capacitor which form primary and secondary sources of direct current firing potential. The actuators are fired from the battery during a collision upon concurrent closure of the switches unless battery power is not available as a result of the collision in which case the actuators are fired from the storage capacitor. Circuitry is provided for monitoring the actuation circuit for malfunction of the switches and the cabling interconnecting the switches and actuators as well as for loss of either the primary or secondary sources of firing potential. The monitoring circuitry includes an indicator lamp which is initially energized during an exercise period each time the vehicle ignition switch is closed. A malfunction causes continued energization of the indicator lamp after the exercise period. Consequently, the driver is informed of any malfunction as well as any indicator lamp outage. A crash recorder is provided which includes upper and lower crash level indicators for providing post-collision determination of the $q$ level of the crash. The recorder also includes a failure time indicator which records the amount of time a malfunction remains uncorrected and is automatically reset at any accelerated rate when the malfunction is corrected. The recorder further includes an air cushion inflation indicator and circuit interrupt which prevents operation of the failure time indicator in the event of air cushion deployment and cooperates with the lower crash level indicator to permit post-collision verification of cushion deployment subsequent to the crash.

7 Claims, 2 Drawing Figures

Patented Jan. 30, 1973

INVENTORS.
Ned E. Dillman,
Arden G. Gillund,
Victor O. Muth &
Pasquale Recupito
BY
Albert F. Duke
ATTORNEY INVENTORS.
Ned E. Dillman,
Arden C. Gillund,
Victor O. Muth &
BY Pasquale Recupito
Albert H. Duke
ATTORNEY

VEHICLE INFLATABLE CUSHION ACTUATION AND MONITORING CIRCUIT

This invention relates in general to safety devices for protecting occupants of a vehicle in the event of a collision and particularly to a circuit for actuating a passenger vehicle safety device and for monitoring for malfunctions in the circuit which might prevent proper actuation of the safety device and for recording certain events related to the operation of the safety device.

It is an object of the present invention to provide an inflatable cushion actuation and monitoring circuit for a passenger conveyance which includes an electrically operated device which is normally actuable in the event of a collision from a primary source of direct current such as a storage battery but which is actuable from a secondary source such as a storage capacitor in the event of failure of the battery during a collision, while providing the operator with a positive indication of loss of the primary or secondary source of firing potential.

It is another object of the present invention to provide recording means for post-collision determination of crash g level and actuation circuit condition.

In accordance with the present invention the actuation circuit for effecting inflation of the air cushion includes a squib which is connected between a pair of acceleration responsive switches which are in turn connected through a pair of diodes to the vehicle battery and a storage capacitor respectively. In the event of a collision causing concurrent closure of the switches the squib is fired from the battery unless as a result of the collision the battery is disconnected from the switches in which event the squib is fired from the storage capacitor. Monitoring circuitry including semiconductor means responsive to the voltage at a junction in the actuation circuit is adapted to energize an indicator lamp whenever the monitored voltage either exceeds a first reference voltage or drops below a second reference voltage, either condition being indicative of a malfunctioning in the actuation circuit. In addition, the monitoring circuit includes semiconductor means for checking whether the storage capacitor is charging and providing an indication to the vehicle operator if the capacitor is open circuited. A crash recorder is provided for the purpose of post-collision determination of actuation circuit condition. The recorder includes an acceleration responsive switch connected in series with a fuse and a cushion interrupt comprising an electrically conductive material enclosing the cushion. A failure time indicator also connected in series with the cushion interrupt provides a post-collision determination of time duration of an actuation circuit malfunction. In the preferred embodiment of the invention the cushion protecting the right front passenger of the vehicle is inflated at two different rates related to a low g level and a high g level collision. The system also incorporates switches responsive to movement of an energy absorbing bumper for actuation of the right front passenger cushion in a low g level collision.

A more complete understanding of the present invention may be had from the following detailed description which should be read in conjunction with the drawings in which.

Figure 1:
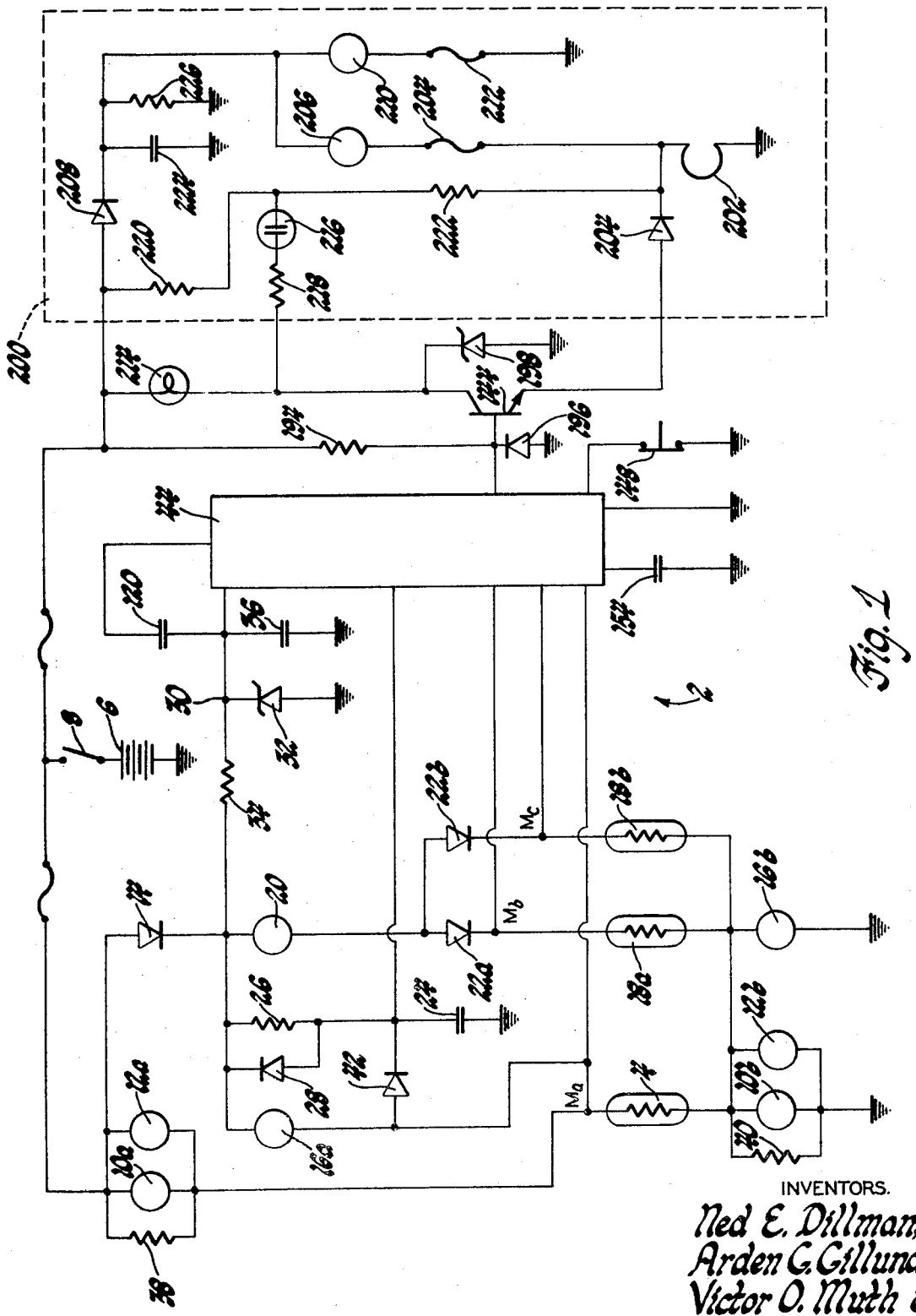
FIG. 1 is a schematic diagram of the actuation and recording circuitry of the present invention with the monitoring circuitry shown in block diagram form.

Referring now to the drawings and initially to FIG. 1 the actuation circuit of the present invention is generally designated 2 and controls the operation of separate air cushions located within the vehicle at the right front and driver positions. The actuation circuit 2 comprises a squib 4 for inflating the passenger cushion at a relatively low inflation rate in response to a relatively low g level collision. The squib 4 is connected across a source of direct current firing potential which may be the vehicle battery 6 through an ignition switch 8 and left bumper switches 10a, 10b and right bumper switches 12a and 12b respectively. The bumper switches are representative of a number of available remotely located crash detectors. In the preferred embodiment the switches 10a, 10b and 12a, 12b are responsive to bumper impact and may be adapted to be closed in response to a predetermined displacement of an energy absorbing bumper or may be constructed to close in response to a predetermined impact velocity. A parallel path for actuating the squib 4 is also established through a diode 14 and normally open acceleration responsive switches 16a and 16b. A suitable acceleration sensor is described in copending application Ser. No. 158,170, filed June 30, 1971, entitled SENSOR by Glenn A. Porter and Normal J. Roth, and assigned to the assignee of the present invention. The threshold of the switches 16a and 16b are set at a relatively low level such as for example 15g's.

Squibs 18a and 18b permit inflation of the driver cushion and passenger cushion respectively at a relatively high inflation rate in the event of a relatively high g level collision. The squibs 18a and 18b are connected across the battery 6 through the diode 14, an acceleration responsive switch 20 and respectively diodes 22a and 22b and the switch 16b. The switch 20 is of the same type as switches 16a and 16b but has its threshold set at a relatively high g level, such as for example, 25g's. The squibs 4, 18a and 18b when actuated rupture a diaphragm in a pressure vessel for initiating inflation of the desired cushion. The squibs 4 and 18b control inflation of the same cushion namely, the passenger cushion, and may be arranged to rupture separate diaphragms in the same pressure vessel permitting low and high rates of inflation as set forth in copending application Ser. No. 175,577, filed Aug. 27, 1971, entitled Occupant Restraint System by Houston F. Blanchard and assigned to the assignee of the present invention.

A secondary source for firing the squibs 4, 18a and 18b is provided by a capacitor 24 which is connected to be charged from the battery 6 through a resistor 26 and is connected to discharge through a diode 28 and actuate either the squib 4 or the squibs 18a and 18b depending on the g level of the collision through a diode 28. The diode 28 is normally back-biased by the battery 6 but in the event of disconnection of the battery during a collision the diode 28 is forward biased to complete the discharge path for the capacitor 24. The output of the battery 6 is regulated at a junction 30 by a zener diode 32 and filtered by a network comprising a resistor 34 and a capacitor 36. Voltage dividing resistors 38 and 40 normally establish a voltage at monitoring junctions $M_a$, $M_b$ and $M_c$ of approximately one-half the potential of the battery 6. The monitoring junction $M_a$ is also connected with the capacitor 24 through a diode 42. Likewise the monitoring junctions $M_b$ and $M_c$ are connected to the capacitor 24 through the squibs 18a or 18b respectively, and the squib 4 and the diode 42. The monitoring junctions of $M_a$, $M_b$ and $M_c$ as well as the regulated voltage of the battery 6 is applied to monitoring circuitry generally designated 44 which in the preferred embodiment of the invention is a dual-in-line integrated circuit.

Figure 2:
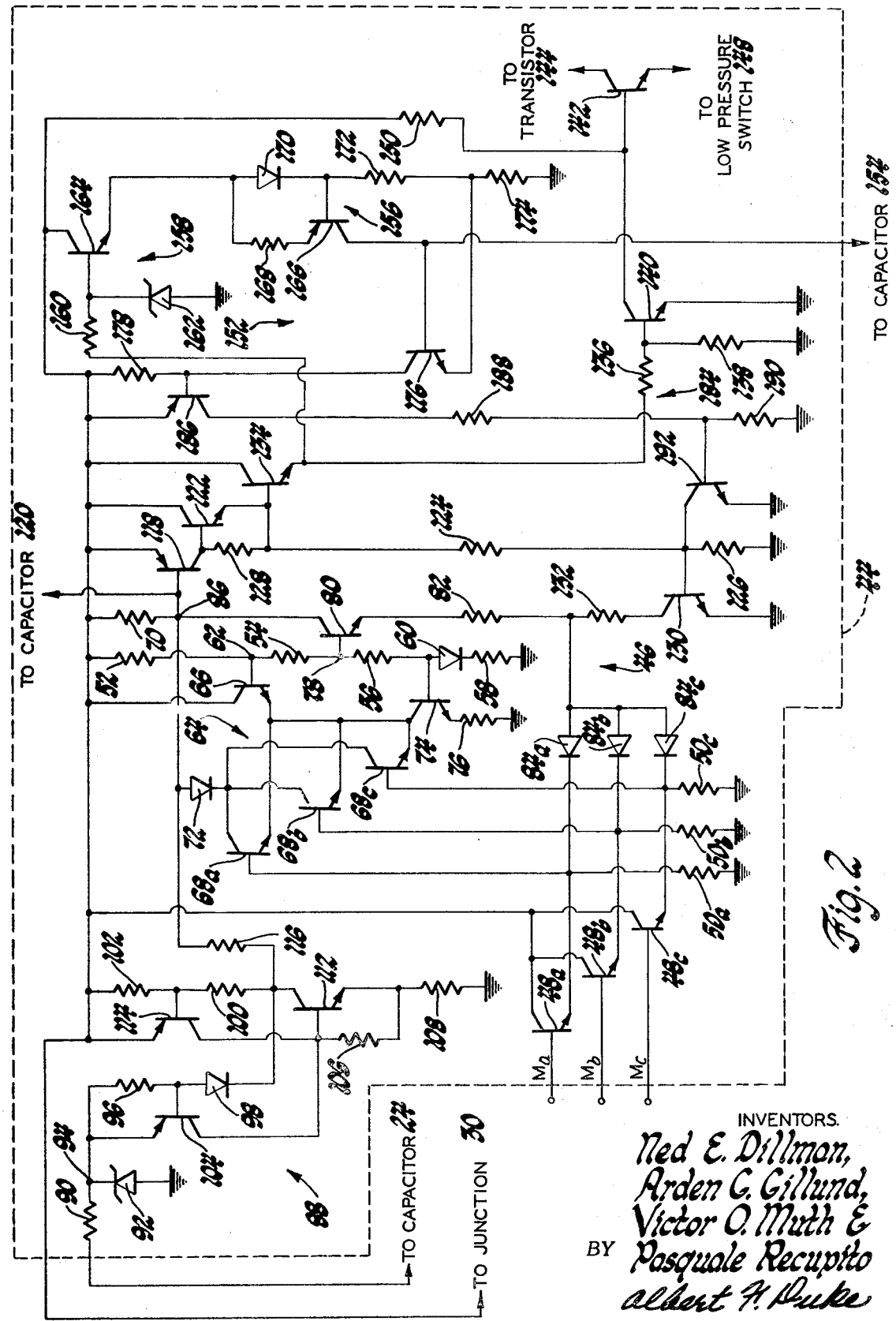
FIG. 2 is a detailed schematic of the monitoring circuitry of the present invention.

As shown in detail in FIG. 2, the monitoring circuitry 44 includes a comparator generally designated 46 which is connected with the actuator circuit 2 through emitter follower input transistors 48a, 48b and 48c having their base electrodes connected with the monitoring junctions $M_a$, $M_b$ and $M_c$ respectively. The collectors of the transistors 48a, 48b and 48c are commonly connected to the junction 30 while the emitters are connected to ground through respective resistors 50a, 50b and 50c. Transistors 48a, 48b and 48c increase the input impedance of the monitoring circuitry 44 to decrease current drain from the actuation circuit 2. The comparator 46 includes a voltage divider network comprising resistors 52, 54, 56 and 58 and a temperature compensating diode 60 which establishes a reference voltage at a first junction 62 which is compared with the voltage at the monitoring junctions $M_a$, $M_b$ and $M_c$ by a differential amplifier configuration generally designated 64. The amplifier 64 includes a transistor 66 responsive to the voltage at the junction 62 and three parallel connected transistors 68a, 68b and 68c responsive to the voltage at the junctions $M_a$, $M_b$ and $M_c$ respectively. The transistor 66 has its base connected to the junction 62 and its collector connected to the junction 30. The transistors 68a, 68b and 68c have their bases connected to the emitters of transistors 48a, 48b and 48c respectively and their collectors connected to the junction 30 through a resistor 70 and a diode 72. The emitters of transistors 66, 68a, 68b and 68c are connected together and through the collector of a constant current sink comprising transistor 74 having its emitter connected to ground through a resistor 76 and its base connected to the junction between the resistor 56 and the temperature compensating diode 60. The voltage at the base of the transistor 66 is normally about two-thirds of the regulated voltage at the junction 30 while the voltage at the bases of transistors 68a, 68b and 68c is normally about one-half the voltage across the battery 6. The transistor 66 is therefore normally biased on while the transistors 68a, 68b and 68c are normally biased to cut off. The voltage divider network provides a second reference voltage at the junction 78 which is compared with the voltage at the junctions $M_a$, $M_b$ and $M_c$ by a transistor 80 having its emitter connected with the emitters of transistors 48a, 48b and 48c through a resistor 82 and respective diodes 84a, 84b and 84c. The collector of the transistor 80 is connected with the junction 30 through the resistor 70 while its base is connected to the junction 78. The voltage established at the junction 78 is normally about one-third of the regulated voltage at the junction 30 while the voltage at the emitter of transistor 80 is normally about one-half the voltage of the battery 6. The transistor 80 is therefore normally cut off. The output of the comparator 46 is provided at a junction 86.

The comparator 46 functions to detect malfunctions in the actuator circuit 2 which produces substantial deviation in the voltage monitoring junction $M_a$, $M_b$ and $M_c$. For example, if one of the switches 16a, 12a, 10a or 20 becomes short circuited, the voltage at the junctions $M_a$ or $M_b$ and $M_c$ will increase to substantially battery potential. This increased voltage drives the transistors 48a or 48b and 48c n increasing the voltage at the base of the interconnected transistor 68a or 68b and 68c driving the transistors on and consequently, biasing the transistors 66 to cut off. The voltage appearing at the junction 86 of the comparator 46 accordingly drops toward ground potential. On the other hand, if one of the switches 10b, 12b or 16b becomes short circuited the voltage at the junctions $M_a$ or $M_b$ and $M_c$ will drop to approximately ground thus driving the transistors 48a or 48b and 48c to cut off. When this occurs the diodes 84a or 84b and 84c are forward biased and the transistor 80 is rendered conductive thus lowering the voltage at the junction 86 toward ground potential. Thus, if the voltage at the monitoring junctions $M_a$, $M_b$ or $M_c$ rises substantially above or drops substantially below the normal voltage of one-half battery potential the output of the comparator 46 at the junction 86 drops to a lower level sufficient to turn on transistor 118. Furthermore, should one of the squibs 4, 18a or 18b become open circuited the voltage at one of the monitoring junctions $M_a$, $M_b$ or $M_c$ assumes substantially battery potential with the result that the transistor 80 is rendered conductive in a similar manner as occurs should one of the switches 10a, 12a, 16a or 20 become short circuited.

The monitoring circuitry 44 further includes an open storage capacitor check circuit generally designated 88 which monitors the charging of the storage capacitor 24. A voltage dropping resistor 90 connects the capacitor 24 to a voltage regulating zener diode 92 which provides a regulated voltage at a junction 94. The capacitor check circuit 88 is connected to the junction 94 and includes a voltage divider network comprising a resistor 96, a diode 98, and a resistor 100 and 102 connected between the regulated junctions 94 and 30. A transistor 104 has its emitter connected with the junction 94, its collector connected to ground through resistors 106 and 108 and its base connected to a junction between the resistor 96 and diode 98. The transistor 112 and 114 form a latch circuit responsive to conduction of the transistor 104. The transistor 112 has its emitter connected to a junction between the resistors 106 and 108, its collector connected to a junction between the diode 98 and the resistor 100 and its base connected to the collector of transistor 104. The collector of the transistor 112 is also connected with a resistor 116 to the output terminal 86. The transistor 114 has its emitter connected to the junction 30, its base connected to a junction between the resistors 100 and 102 and its collector connected to the base of the transistor 112.

The storage capacitor check circuit 88 functions in the following manner. When the ignition switch 6 is closed the voltage at the junction 30 is initially ground due to the discharged state of the filter capacitor 36. If the storage capacitor 24 is functioning properly the voltage at the junction 94 will also be initially ground. The charging time for the capacitor 24 is substantially longer than that of the capacitor 36 so that the voltage build up on the capacitor 36 leads that on the capacitor 24 thus reverse biasing the diode 98 and maintaining the transistor 104 in cut off. On the other hand, if the capacitor 24 is open circuited the voltage at the junction 94 upon closure of the ignition switch 8 is the regulated voltage established by the zener diode 92. During the charging interval of the filter capacitor 36 a current path is established through the voltage divider network including the resistor 96, diode 98 and resistors 100 and 102 driving the transistor 104 to saturation. The transistor 104 in turn drives transistor 112 to saturation which in turn drives the transistor 114 on insuring continued conduction of transistor 112 after the filter capacitor 36 has charged sufficiently to back-bias the diode 98 and cut off the transistor 104. With the transistor 112 conducting, the voltage at the output 86 drops toward ground potential.

The output of the comparator 46 and the check circuit 88 appearing at the junction 86 is applied to a time delay circuit comprising a transistor 118 and a capacitor 120 (FIG. 1). The transistor 118 has its emitter connected to the junction 30 and its collector connected to the base of an amplifying stage comprising a transistor 122 having its collector connected to the junction 30 and its emitter connected to ground through resistors 124 and 126. When the voltage at the base of transistor 118 drops as the result of a detected malfunction in the actuator circuit 2 the transistor 118 and 122 are rendered conductive. The capacitor 120 is connected across the emitter of the base electrodes of the transistor 118 to roll off the high frequency response of the transistor 118. For an output of the comparator 46 to turn on the transistor 118 the signal must be present for a period of time determined by the value of the capacitor 120, the emitter base turn-on voltage of the transistor 118 and the capacitor charging current from the transistors 68a, 68b, 68c, 80 or 112. A resistor 128 connected across the emitter base electrodes of the transistor 122 bypasses high temperature leakage from the transistor 118.

A latch circuit comprising a transistor 130 having its base connected to the junction between resistors 124 and 126, its emitter grounded and its collector connected to the emitter of transistor 80 through the resistor 82 and a resistor 132. The transistor 130 is rendered conductive in response to conduction of the transistor 122 with the result that the transistor 80 is either rendered conductive or is maintained in conduction thus insuring continued conduction of transistor 118 and consequently the transistor 122 until the transistor 130 is cut-off thereby interrupting the latch. The latch interrupt circuit will be described hereinafter.

The emitter of the transistor 122 is connected to the base of an amplifying transistor 134 having its collector connected to the junction 30 and its emitter connected to ground through resistors 136 and 138. Control transistors 140 and 142 control a lamp driver transistor 144 (FIG. 1). The emitter of transistor 140 is grounded while the emitter of transistor 142 is connected to ground through a normally closed pressure switch 148 (FIG. 1) associated with the pressure vessels for inflating an air cushion. Only one pressure switch 148 is shown but separate series connected pressure switches would be provided for each pressure vessel. The base of transistor 140 is connected to the junction between resistors 136 and 138 while the collector of transistor 140 is connected to the base of transistor 142 and to junction 30 through a resistor 150. The collector of transistor 142 is connected to the base of transistor 144 (FIG. 1). Transistor 140 is biased to cut-off in the absence of conduction of transistor 134 and current flow through the resistor 150 and the emitter-base electrodes of the transistor 142 normally renders the transistor 142 conductive which in turn grounds the base of transistor 144 to hold the transistor 144 nonconductive. The transistor 142 is cut-off in response to conduction of the transistor 140 or opening of the pressure switch 148. Transistor 140 is rendered conductive in response to conduction of the transistor 134.

A timing circuit generally designated 152 comprises a capacitor 154 (FIG. 1) which is charged from a constant current source generally designated 156 which in turn has a regulated voltage applied thereto from a regulating network generally designated 158. The regulator 158 includes a resistor 160 and a zener diode 162 connected between ground and the emitter of transistor 134. The junction between the resistor 160 and the zener diode 162 is connected to the base of the transistor 164 having its collector connected to the junction 30 and its emitter connected to the constant current source 156. The constant current source 156 comprises a transistor 166 having its emitter and base connected to the emitter of transistor 164 through a resistor 168 and diode 170 respectively. The base of transistor 166 is also connected to ground through voltage dividing resistors 172 and 174. The voltage established at a junction between the voltage dividing resistors 172 and 174 is applied to the emitter of a transistor 176 having its base connected with the capacitor 154 and its collector connected to junction 30 through a resistor 178.

The timing function of the circuit 152 is initiated upon conduction of the transistor 134 which turns on current source 156. When the constant current source 156 charges the capacitor 154 above the voltage established at the emitter of transistor 176 by the resistor 174, the transistor 176 is rendered conductive to energize an unlatching circuit generally designated 184.

The unlatching circuit 184 comprises a transistor 186 having its base connected with the collector of transistor 176, its emitter connected to the junction 30 and its collector connected to ground through resistors 188 and 190. A second transistor 192 has its emitter grounded, its base connected to the junction between the resistors 188 and 190 and its collector connected with the base of the transistor 130. Upon conduction of the transistor 176 the transistors 186 and 192 are rendered conductive to remove the base drive to the transistor 130 thus rendering it nonconductive, and in turn unlatching the transistors 80, 118, 122 and 134. When the transistor 134 is rendered nonconductive the current source is rendered nonconductive and the capacitor 144 discharges through the transistor 176 and the resistor 174.

Referring again to FIG. 1 the base of transistor 144 is connected through a resistor 194 to the battery 6 through the ignition switch 8. A diode 196 and a zener diode 198 provide transient protection for the transistor 144. A crash recorder generally designated 200 is connected with the battery 6 and the transistor 144 and includes a cushion interrupt 202 which connects the emitter of transistor 144 to ground through a diode 204. The cushion interrupt 202 is conductive wire that encloses the cushion in its stored position and provides a circuit interruption upon deployment of the cushion. The interrupt 202 is also connected in series with a fuse 204 and an acceleration responsive switch 206. The switch 206 is similar to the switches 16a and 16b and has a threshold level set at the threshold level of the switches 16a and 16b, for example, 16g's. The switch 206 is connected to the battery 6 through the ignition switch 8 and a diode 208. An acceleration responsive switch 210 is connected between the diode 208 and ground through a fuse 212 and is similar to the switch 206 but has its threshold set at a level of approximately 50g's. The collector of transistor 144 is connected to the battery 6 through the ignition switch 8 and an indicator lamp 214. The collector of transistor 144 is also connected with a failure time indicator comprising a conventional E cell 216 serially connected with the collector of transistor 144 through a resistor 218 and to a junction between voltage dividing resistors 220 and 222 which are connected in series between the cushion interrupt 202 and the battery 6. The E cell 216 has two electrodes enclosed within a housing containing an electrolyte. When the transistor 144 conducts, current flow through the cell 216 causes a plating of one of the electrodes. When the transistor 144 is cut-off, a trickle current flows through the lamp 214 and through the cell 216 in an opposite direction to cause a deplating operation. The voltage dividing resistors 220 and 222 are selected so that the deplating operation removes material at an accelerated rate as compared to the rate of build up of material during the plating operation. By examining the amount of material plated one can ascertain the duration of a malfunction in the actuator circuit 2. A capacitor 224 is charged from the battery 6 through the diode 208 and provides a source of current to be delivered to the fuses 204 and 212 in the event of disconnection of the battery 6 during a collision. A resistor 226 provides a discharge path for the capacitor 224 upon opening of the ignition switch 8.

The overall operation of the circuit is as follows: If the capacitor 24 is functioning properly so as to be able to accumulate a charge the junctions $M_a$, $M_b$ and $M_c$ see ground through the diode 42 and the capacitor 24 at the instant the ignition switch is closed. With the junctions $M_a$, $M_b$ and $M_c$ at substantially ground potential the transistors 48a, 48b and 48c are cut off and the output of the comparator 46 drops towards ground potential due to the conduction of transistor 80. The drop in potential at the junction 86 renders the transistors 118, 122 and 134 and 140 conductive and the latching transistor 130 maintains the conduction of these transistors until the timing capacitor 154 is sufficiently charged to energize the latch interrupt circuit 184 and render the transistor 130 nonconductive. Preferably this charge time interval is approximately 10 seconds. During this exercise interval the transistor 142 is cut off and the transistor 144 is rendered conductive by current flow through the resistor 194 and energizes the lamp 214. Also during this exercise interval, the capacitor 24 will have charged to its fully charged state and the voltage at the junctions $M_a$, $M_b$ and $M_c$ will have risen to substantially one-half the potential of the battery 6. The transistors 48a, 48b and 48c are thus rendered conductive in their linear active region, reverse biasing diodes 84a, 84b and 84c and allowing the transistor 80 to cut off at the end of the exercise interval. With transistor 80 cut off the voltage at the output junction of the comparator 46 rises to substantially the voltage at the regulated junction 30. The operator is thus informed of any outage of the lamp 214 by knowledge of the fact that it should momentarily illuminate upon closure of the ignition switch 8. Thus after the 10 second interval the transistor 134 would normally be rendered nonconductive as would the transistor 144 thus deenergizing the lamp 214.

If a malfunction of the type previously described exists or subsequently develops in the actuator circuit 2 the output of the comparator 46 will remain at a lower potential notwithstanding the interruption of the latching transistor 130 after the 10 second timing interval. Consequently, the transistor 144 will remain conductive and the lamp 214 will remain energized to indicate such malfunction to the operator. Such malfunctions would include a short circuited condition response switch, an shorted storage capacitor or one which failed to accept an initial charge, open-circuited cables and connectors, cables shorted to ground or battery hi, or open-circuit squib. In addition, any loss of pressure in the pressure vessels results in open-circuiting the emitter of transistor 142 which renders the transistor 144 conductive energizing the lamp 214. Furthermore, a loss of battery potential to the actuator circuit 2 will remove base drive to the transistor 142 thus rendering the transistor 144 conductive thereby energizing the lamp 214.

Each time the transistor 144 is energized the plating operation takes place in the cell 216 and the deplating operation occurs when the transistor 144 is cut off. Thus by checking the condition of the failure time indicator 216 it may be determined, subsequent to a crash, whether a malfunction in the actuator circuit 2 existed at the time of the crash and thereby prevented inflation of the cushion. The condition of the fuse 204 permits a post-crash determination of the g level of the collision in the event that the cushion is not inflated. If the collision exceeds a 15g level and the cushion is not inflated, the fuse will be open-circuited indicating a malfunction in the low g portion of the actuator circuit 2. On the other hand if the fuse 204 is not open-circuited an indication is provided that the g level of the collision was below that for which the system is designed to inflate the cushion. Moreover, the fuse 204 provides an indication of whether the cushion was inflated prior to or at the time of the collision since, if prior to the collision the cushion interrupt 202 will disconnect the fuse 204 from ground thereby preventing current flow through the fuse 204, while if the cushion is inflated as a result of the crash current flow through the fuse 204 will cause the fuse 204 to flow prior to opening of the electrically conductive element 202. The fuse 212 provides an indication of a high g collision beyond the capabilities for which the actuator circuit is designed.

We claim:

1. In a passenger conveyance provided with an inflatable cushion adapted to be actuated by electrically operated actuator means the combination of:

an actuation circuit for operating said actuator means and comprising a primary source of direct current, a storage capacitor, switch means connecting said storage capacitor to said primary source for charging said storage capacitor to provide a secondary source of direct current, first and second normally open acceleration responsive switch means connected to opposite sides of said actuator means and forming a series network connected to said primary source and said secondary source, means responsive to loss of said primary source for providing a discharge path through said series network from said secondary source, first voltage divider means normally establishing a predetermined voltage at a monitoring junction in said series network, indicator means, monitoring means comprising comparator means including second voltage divider means establishing first and second reference voltages at first and second reference junctions respectively, said comparator means further including first and second semiconductor means responsive to the voltage at said first and second reference junctions respectively and the voltage at said monitoring junction for developing a predetermined output when the voltage at said monitoring junction exceeds said first reference voltage or drops below said second reference voltage, said comparator means further including third semiconductor means responsive to the absence of charge accumulation by said secondary source when initially connected to said primary source by said switch means for developing said predetermined output, additional semiconductor means responsive to said predetermined output of said comparator means for energizing said indicator means.

2. In a passenger conveyance provided with an inflatable cushion adapted to be actuated by electrically operated actuator means the combination of:

an actuation circuit for operating said actuator means and comprising a primary source of direct current, a storage capacitor, switch means connecting said storage capacitor to said primary source for charging said storage capacitor to provide a secondary source of direct current, first and second normally open acceleration responsive switch means connected to opposite sides of said actuator means and forming a series network connected to said primary source and said secondary source, means responsive to loss of said primary source for providing a discharge path through said series network from said secondary source, first voltage divider means normally establishing a predetermined voltage at a monitoring junction in said series network, first indicator means, monitoring means comprising comparator means including second voltage divider means establishing first and second reference voltages at first and second reference junctions respectively, said comparator means further including first and second semiconductor means responsive to the voltage at said first and second reference junctions respectively and the voltage at said monitoring junction for developing a predetermined output when the voltage at said monitoring junction exceeds said first reference voltage or drops below said second reference voltage, said comparator means further including third semiconductor means responsive to an open circuit condition between said primary and secondary sources upon closure of said switch means for developing said predetermined output, additional semiconductor means responsive to said predetermined output of said comparator means for energizing said first indicator means, recorder means including a series network connected across said primary source and comprising third acceleration responsive switch means and second and third indicator means, said third acceleration responsive switch means being adapted to close and complete said series network in response to a conveyance deceleration level of a magnitude sufficient to actuate said first and second acceleration responsive switch means, said second indicator means providing a permanent indication of current flow in said series network, and said third indicator means open circuiting said series network in response to inflation of said cushion, said recorder means further including resettable indicator means for indicating the duration of energization of said first indicator means.

3. In a passenger conveyance provided with an inflatable cushion adapted to be actuated by electrically operated actuator means, the combination of:

an actuation circuit for operating said actuator means and comprising a primary source of direct current, filtering means including a filter capacitor connected with said primary source, a storage capacitor, means including a charging resistor and a first unidirectional conducting device connecting said storage capacitor to said primary source for charging said storage capacitor and providing a secondary source of direct current, first and second normally open condition responsive switch means connected to opposite sides of said actuator means and forming a series network connected to said primary source through said first unidirectional conducting device whereby said actuator means is energized from said primary source in response to concurrent closure of said first and second switch means, a second unidirectional conducting device connected in parallel with said charging resistor and providing a path for energizing said actuator means from said secondary source in the event of failure of said primary source, first voltage divider means normally establishing a predetermined voltage at a monitoring junction in said series network, indicator means, monitoring means comprising comparator means including second voltage divider means establishing first and second reference voltages at first and second reference junctions respectively, first and second semiconductor means responsive to the voltage at said first and second reference junctions respectively and to the voltage at said monitoring junction for developing a predetermined output when the voltage at said monitoring junction exceeds said first reference voltage or drops below said second reference voltage respectively, third semiconductor means connected with said secondary source and said filter capacitor for developing said predetermined output during the charging interval of said filter capacitor and for maintaining said predetermined output in the absence of charge accumulation by said secondary source, semiconductor latch means responsive to said predetermined output from said comparator means for maintaining the said predetermined output from said comparator means, fourth semiconductor means responsive to said predetermined output of said comparator means for energizing said indicator means, semiconductor unlatching means including a constant current source and a timing capacitor, said semiconductor unlatching means being connected with said semiconductor latch means for disabling said semiconductor latch means a predetermined interval of time after said predetermined output is received from said comparator means.

4. The invention according to claim 3 wherein said first semiconductor means includes a differential amplifier comprising first and second transistors each having emitter base and collector electrodes, the base electrode of the first transistor being connected to said monitoring junction, the base electrode of said second transistor being connected with said first reference junction, constant current sink means connected with the emitter electrodes of said first and second transistors, the collector electrode of said first transistor being connected with said primary source and providing said predetermined output when the voltage at said monitoring junction exceeds said first reference voltage, said second semiconductor means comprising a transistor having its emitter connected with said monitoring junction, its base connected with said second reference junction and its collector connected with said primary source for developing said predetermined output when the voltage at said monitoring junction drops below said second reference voltage.

5. The invention according to claim 3 wherein said third semiconductor means comprises first, second and third transistors, said first transistor being connected with said secondary source and said filter capacitor and rendered conductive during the charging of said filter capacitor in the absence of accumulation of charge on said secondary source, said second and third transistors being sequentially energized in response to energization of said first transistor to provide a latch circuit for said first transistor to maintain said output after said filter capacitor has reached a predetermined charge potential.

6. The invention according to claim 3 wherein said semiconductor means for energizing said indicator means comprises first, second and third transistors, said first transistor having emitter and collector electrodes connected in series with said indicator means, said second transistor having its collector electrode connected with the base of said first transistor and means connecting its emitter electrode to ground, means normally biasing said second transistor into saturation for maintaining said first transistor at cut off, said third transistor having its collector electrode connected with the base electrode of said second transistor and its emitter electrode connected to ground, the base of said third transistor being connected with said latch means whereby said third transistor is rendered conductive when said predetermined output is received from said comparator means and said second transistor is rendered nonconductive to render conductive said first transistor and energize said indicator means.

7. The invention according to claim 6 wherein a source of pressurized fluid is provided for inflating said cushion in response to operation of said actuator means and wherein said means connecting the emitter electrode of said second transistor to ground includes a normally closed switch responsive to the pressure of said fluid whereby said second transistor is rendered nonconductive and said indicator means is energized in response to loss of said source of pressurized fluid.

* * * * *